United States Patent Office 3,177,069
Patented Apr. 6, 1965

3,177,069
METHODS OF MANUFACTURING FISSIONABLE MATERIALS FOR USE IN NUCLEAR REACTORS
Marcel Englander, Paris, and Jacques André Stohr, Bures-sur-Yvette, France, assignors to Commissariat à l'Energie Atomique, Paris, France
No Drawing. Original application June 7, 1956, Ser. No. 589,876. Divided and this application Feb. 24, 1960, Ser. No. 10,541
Claims priority, application France, June 14, 1955, 693,701, Patent 1,129,082; Apr. 21, 1956, 713,135, Patent 1,149,991
4 Claims. (Cl. 75—122.7)

The present invention relates to methods of manufacturing fissionable materials, including high proportions of uranium, for use in particular in nuclear reactors.

Pure metallic uranium, when used as fissionable material in a nuclear reactor, has, from the mechanical point of view, drawbacks which are the more important as the flux of neutrons and the power to be supplied are higher. The fissionable material in the form of bars or slugs is deformed and there are risks of said material deteriorating the protective jackets or cans in which said bars are enclosed.

The object of the present invention is to provide a fissionable material which is free from these drawbacks.

For this purpose, according to our invention, such a fissionable material is constituted by an alloy of uranium, at least one first addition metal of the group consisting of aluminium, zirconium, chromium, titanium and vanadium and at least one second addition metal different from the first one and belonging to the fifth horizontal line of the periodical classification of chemical elements, that is to say a metal of the group consisting of yttrium, zirconium, niobium, molybdenum, ruthenium, rhodium, palladium, silver, cadmium, indium, tin and antimony.

It was found that the presence of this second addition metal greatly facilitates the thermal treatment necessary for the obtainment of the desired material and, in particular, the duration of this treatment, instead of being from 200 to 300 hours when the alloy contains only the first addition metal, may be reduced to less than 50 hours owing to the presence of the second addition metal.

The amounts of the addition metals are low for the first element and still lower for the second one. Practically they do not exceed 2% by weight for the first one and 1% by weight for the second one, these weights being based upon that of the pure metallic uranium present in the alloy.

The second addition metal is advantageously constituted by zirconium (of course when the first addition metal does not consist of zirconium); its amount is then about 0.1% by weight. We may also use molydenum as second addition metal, its amount then ranging from 0.5% to 1% by weight. Advantageously, the second addition metal is added in the form of an alloy of said metal with uranium.

According to a first embodiment of the method according to our invention, the addition metals are added to pure metallic uranium, in one or several steps, for instance by first forming an alloy of uranium with the first addition metal and adding the second addition metal to this alloy. The whole is melted under a vacuum averaging from $10^{-4}$ to $10^{-5}$ mm. of mercury. The molten bath is then heated to a temperature averaging 1,500° C. for a time sufficient to ensure full dissolution of the constituents and full degassing. The whole is then poured into molds in the form, for instance, of small bars.

According to a second embodiment of our invention, the suitable amount of the first addition metal is added to uranium tetrafluoride. This addition metal is either in the pure state, or in the state of a combination that is reducible by calcium, magnesium or any other metal capable of reducing uranium tetrafluoride. This mixture of uranium tetrafluoride and the first addition metal is then subjected to the action of calcium, magnesium or said other metal to reduce uranium tetrafluoride. The suitable amount of the second addition metal is added to the alloy of uranium and the first addition metal thus obtained. The whole is then treated in the above mentioned way.

The alloy obtained by either of the above described methods is a two phase alloy, with coarse grains, which has very serious advantages over pure uranium, from the points of view of mechanical characteristics and thermal fatigue. However, the coarse dispersion of the second phase causes mechanical or other sensitizing effects to exist at certain points of the mass of the alloy, and it is necessary to elminate such effects by a suitable thermal treatment.

For this purpose, the alloy thus obtained is heated to a temperature such that, after a sufficient time and without apparent deformation, all traces of the second phase which caused said sensitizing effect seem to disappear. This treatment is preferably performed, according to the invention, under a vacuum averaging $10^{-3}$ mm. of mercury in order to avoid any oxidation, at a temperature higher than 1000° C. and lower than the temperature at which the alloy starts melting. The alloy is then suddenly quenched in a cold oil bath, also under vacuum. This treatment for solubilizing or homogenizing the solid phase, which doubles the hardness of the alloy, gives it a crystalline structure of a transitory character which must be transformed into a stable structure by an annealing treatment.

This annealing treatment consists, according to the present invention, in heating the metal mass to a temperature near the upper limit of the range of stability of the orthorhombic phase of uranium (i.e. about 660° C.) for a time sufficient to permit a crystalline re-arrangement of the matrix or uranium phase and a very fine and very regular precipitation of the second phase. This further treatment then gives the alloy a still higher hardness and a better resistance to thermal fatigue than that of the solubilized alloys.

We will now give examples of the method according to our invention.

In a first example, a billet of uranium of about 50 kgs. contains, in a recess provided for this purpose about 0.4% of its weight of aluminium shot in a state of purity of 99.99% and 0.15% of zirconium in the form of a uranium-zirconium alloy containing 2.5% of zirconium.

This billet having its recess thus filled is heated under a vacuum, for instance by induction at high frequency (from 4 kc. to 800 kc. for instance), in a retort protected in such manner that the corrosive action by molten uranium is limited to a minimum. This heating is conducted in such manner as always to preserve a vacuum ranging from $10^{-4}$ to $10^{-5}$ mm. of mercury inside the apparatus. After melting, the temperature is brought to about 1,500° C. for from 30 to 45 minutes, and the molten mass, still under a vacuum, is poured by means of a funnel, into suitable molds. The casting is effected by gravity. A plug of a refractory material, disposed at the bottom of the retort, is lifted at the desired time by a pushrod actuated from the outside. The ingots are removed from the mold after cooling under a vacuum, in order to avoid oxidation of the alloy.

We thus obtain billets of alloy which are subsequently transformed into bars, either by rolling, or by hammering, or by hot drawing, or otherwise. It is also possible directly to obtain bars of a diameter averaging from 16 to 36 mm. and of a length ranging from 30 to 50 cm.

The alloy thus obtained is then subjected, according to the invention, to a first thermal treatment. This treatment consists in heating the alloy under a pressure of about $10^{-3}$ mm. of mercury for about 50 hours at a temperature of about 1,050° C. in a resistance furnace provided with a tank which contains oil. In order to prevent an uncontrolled precipitation during cooling down to the ordinary temperature, the alloy is dropped at the end of the solubilizing treatment, into the cooled oil bath, thus performing a sufficiently sudden quenching to maintain the aluminium is sursaturated solution in the uranium matrix which is then in a metastable structural state of transitory character.

The morphologic state of this alloy is then stabilized by a new thermal treatment which consists in heating this alloy under a vacuum at a temperature of about 600° C., for about ten minutes. We thus obtain a metal the Vickers hardness of which averages 420 whereas ordinary uranium has a hardness of only 210. Our alloy is not deformed when subjected to thermal fatigue tests.

According to a second example, about 52 kgs. of uranium tetrafluoride are treated according to one of the conventional reduction methods, by means of 19 kgs. of calcium to which have been added either about 150 grams of aluminium in the form of shavings or 250 grams of powdered alumina.

We thus obtain raw alloy billets which are again molten so as to degas them, to which there is added 0.15% by weight of zirconium in the form of an alloy of zirconium and uranium containing about 2.5% by weight of zirconium.

These billets are then subjected to the thermal treatments described with reference to the preceding example.

Of course, our invention, which permits of increasing the duration of life of the fuel of a nuclear reactor making use of natural uranium or uranium enriched in fissionable elements, is not limited in any way to the above described examples. It also covers the case where there is added any metal capable, in small amounts (case of the first addition metal), of supplying an alloy having an eutectoid reaction, therefore capable of having its physical and mechanical characteristics substantially improved by suitable thermal treatments including solubilizing reheatings, quenching and annealings with or without mechanical treatment. Addition of the second metal considerably reduces the duration of said treatments.

In a general manner, while we have, in the above description, disclosed what we deem to be practical and efficient embodiments of our invention, it should be well understood that we do not wish to be limited thereto as there might be changes made therein without departing from the principle of the present invention as comprehended within the scope of the accompanying claims.

The present application is a division of our U.S. patent application Ser. No. 589,876 now abandoned, filed June 7, 1956, for "Improvements in Fissionable Materials for Use in Nuclear Reactors and in the Methods of Manufacturing Such Materials."

What we claim is:

1. The method of manufacturing a fissionable material which comprises forming a coarse grain alloy of uranium, from 0.1 to 2+ percent of the weight of uranium of aluminium, and from 0.05 to 1% of the weight of uranium of zirconium, heating the molten alloy thus obtained under a vacuum ranging from $10^{-4}$ to $10^{-5}$ mm. of mercury at a temperature of about 1,500° C. allowing said alloy to solidify, heating it under a vacuum of approximately $10^{-3}$ mm. of mercury at a temperature higher than 1,000° C. but lower than the melting point of said alloy, for about 50 hours, quenching suddenly said alloy and annealing it at a temperature of about 600° C.

2. The method according to claim 1 in which an alloy of uranium with aluminium is first formed and zirconium is then added to this metal.

3. The method according to claim 1 in which said zirconium is added in the form of an alloy thereof with uranium.

4. The method according to claim 1 in which the duration of said first heating, at about 1,500° C., ranges from 30 to 45 minutes and the annealing operation lasts for about 10 minutes.

References Cited in the file of this patent
UNITED STATES PATENTS

| | | |
|---|---|---|
| 2,830,896 | Seybolt | Apr. 15, 1958 |
| 2,886,430 | Allen et al. | May 12, 1959 |
| 2,947,621 | Foote | Aug. 2, 1960 |

OTHER REFERENCES

"Proceedings of the International Conference on the Peaceful Uses of Atomic Energy"; held in Geneva Aug. 8 to Aug. 20, 1955; vol. 9, pp. 57–67 (rec'd April 16, 1956).